Aug. 30, 1966      W. L. HART      3,269,219

PLANETARY TRANSMISSION FOR MACHINE TOOLS

Filed April 16, 1963     2 Sheets-Sheet 1

INVENTOR.
WALTER L. HART
BY
Wheeler, Wheeler & Wheeler
ATTORNEYS

INVENTOR.
WALTER L. HART
BY
Wheeler, Wheeler & Wheeler
ATTORNEYS 3,269,219
PLANETARY TRANSMISSION FOR
MACHINE TOOLS
Walter L. Hart, 6528 W. Center St., Milwaukee, Wis.;
Chauncy C. Hart, executor of Walter L. Hart, deceased
Filed Apr. 16, 1963, Ser. No. 273,419
4 Claims. (Cl. 74—781)

This invention relates to a machine tool with continuously operating flywheel having a built-in planetary transmission for accommodating changes in load.

As applied, for example, to a press having a jaw movable rapidly toward a position of work engagement and then movable at greatly reduced speed and with increased pressure during an interval of heavy load, the arrangement permits energy to be stored in the flywheel during that part of the cycle in which the jaw is relatively unloaded and the flywheel then continues in unimpeded rotation at a substantially constant rate while delivering power to the jaw with greatly increased mechanical advantage and correspondingly reduced jaw speed during that part of the cycle in which the jaw is engaging the work.

In the preferred embodiment disclosed, the flywheel is mounted on the casing of a planetary transmission. The casing serves as a planetary gear carrier and is rotatably mounted on the hubs of two sun gears, one of which is fixed to the load shaft and the other of which is floating free of the load shaft and connected with a brake drum by which it can selectively be fixed or permitted to rotate. The two sun gears have hub portions which support the casing from bearings sufficiently strong so that the flywheel can be mounted on the casing. For this purpose, the flywheel is bored to receive the casing and counterbored to receive the radially extended closure flange for the casing, the latter being bolted to the end of the flywheel.

In the preferred embodiment a fluid operated clutch provides for direct drive connection between the flywheel and the load shaft, the clutch being disengaged and engaged alternately with the application and release of braking action on the drum connected to the floating sun gear.

Figure 1:
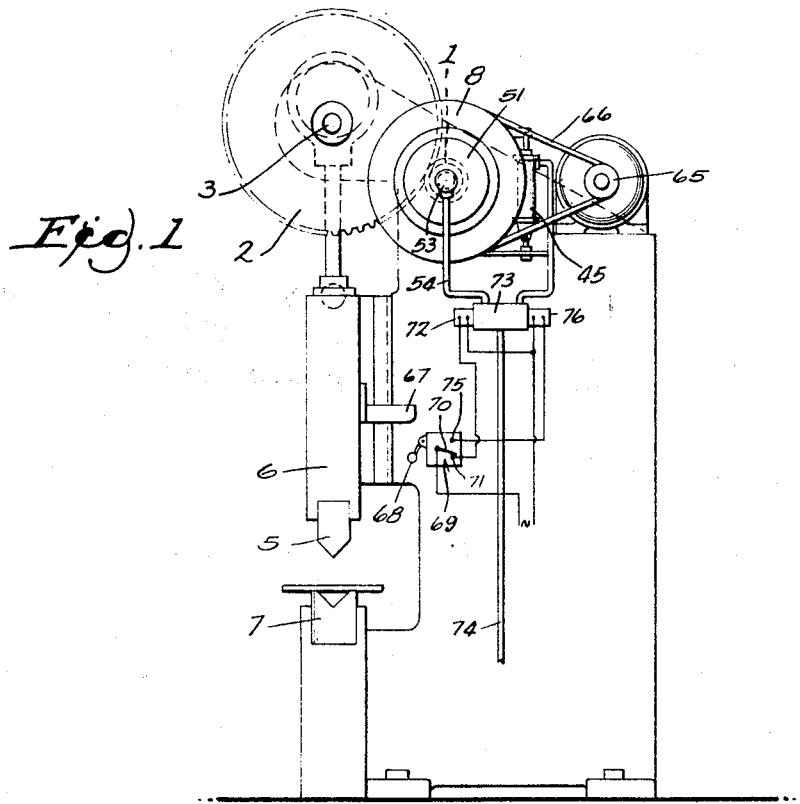
FIG. 1 is a view in end elevation of a press brake selected to exemplify an embodiment of the invention.
Figure 3:
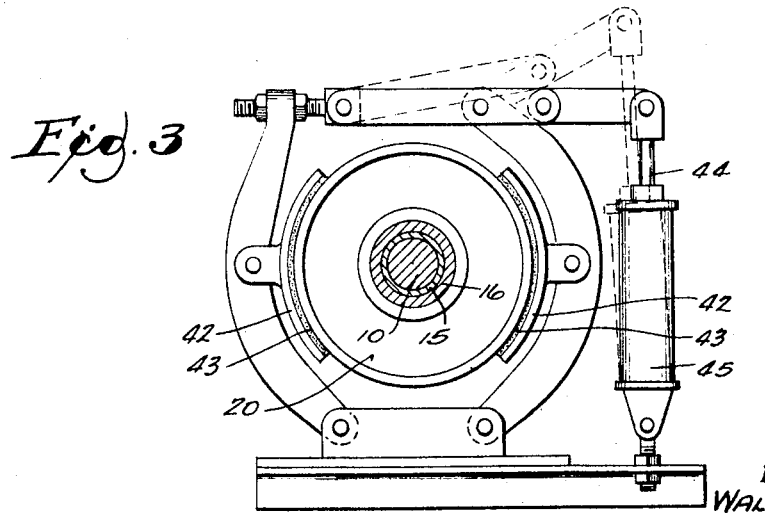
FIG. 3 is a view on a reduced scale on the line 3—3 of FIG. 2.

The press brake is claimed only generically as one element of a combination in which a tool moves with high speed and low power until the point of work engagement, at which time the tool moves with low speed and high power through that portion of the cycle in which the work is formed. The tool in the exemplification is a die 5 mounted on slide 6 for reciprocation to and from the work-supporting die 7.

The drive shaft 10 of the press carries pinion 1 meshing with gear 2 on eccentric shaft 3. The eccentric actuates the slide 6 in known fashion.

The flywheel 8 is concentric with shaft 10 but is not fixed thereto in accordance with conventional practice. Instead, flywheel 8 is mounted on the casing of a planetary transmission which intervenes between the flywheel and shaft 10 as hereinafter described. A fluid operated clutch 11 normally couples the flywheel 8 in direct drive connection with shaft 10 during that part of the cycle in which the shaft is relatively free of load and the flywheel is absorbing energy. During that part of the cycle in which the die 5 is acting on the work, the shaft 10 is heavily loaded. In this part of the cycle the flywheel is giving up energy. At this part of the cycle the direct drive clutch is released and the continuously meshing gears of a planetary transmission generically designated by reference character 12 are rendered active to enable the shaft 10 to move at a greatly reduced speed respecting the constant-speed flywheel, to enable the flywheel energy to be delivered to the shaft at correspondingly increased mechanical advantage.

The planetary transmission comprises a mounting sleeve 15 on which hubs 16 and 17 are axially aligned. The hub 17 is fastened non-rotatively to shaft 10 by means of the taper coupling 18. The hub 16 is assembled with a brake drum 20 and the assembly is rotatable respecting the mounting sleeve 15 and shaft 10 on bearings 21 and 22. The hub 16 is formed with gear teeth to provide a sun gear 25 and a coaxial sun gear 26 with a different number of teeth is mounted on hub 17.

The casing 30 serves as a planetary gear carrier. It is annular in form and has an annular closure 31. Approprite bearings at 32 and 33 in the end wall of casing 30 and in the closure 31 support a planetary shaft or shafts 34. Upon shaft 34 are mounted the planetary gear 35 meshing with sun gear 25 and the planetary gear 36 meshing with sun gear 26. The gears 35 and 36 are keyed or otherwise connected to shaft 34 to rotate in unison. The entire assembly of casing 30, closure 31 and the planetary shafts and pinions is mounted for rotation on hubs 16 and 17 by bearings at 38 and 39 which are heavy enough to support the flywheel 8 mounted on casing 30. The flywheel is bored to receive the casing and counterbored to receive the extended flange 40 of the casing closure 31, the flange being bolted to the flywheel as a convenient means of connecting the flywheel securely with casing 30.

Any appropriate brake is provided for arresting rotation of brake drum 20. As shown, the brake is conventional and includes brake shoes 42 having linings at 43 and a fluid pressure applicator which includes ram 44 and ram cylinder 45.

The fluid clutch 11 which releasably connects the flywheel in direct drive relation to shaft 10 comprises a rotatable casing 50 having a closure 51 which constitutes a cylinder in which a piston 52 is reciprocable in response to pressure communicated to the cylinder through the swivel connection 53 from the fluid pressure line 54.

A hub 55 connected to shaft 10 carries one or more floating disks 56 with double facings at 57. One of these facings is directly engaged by a disk 58 slidable on bar 59 for keyed connection to rotate with casing 50. An opposing face is provided by the casing itself at 60. If there are two or more of the driven disks 56, there will be one or more floating driving disks 62 slidable on bar 59 and thereby keyed to rotate with casing 50.

Figure 2:
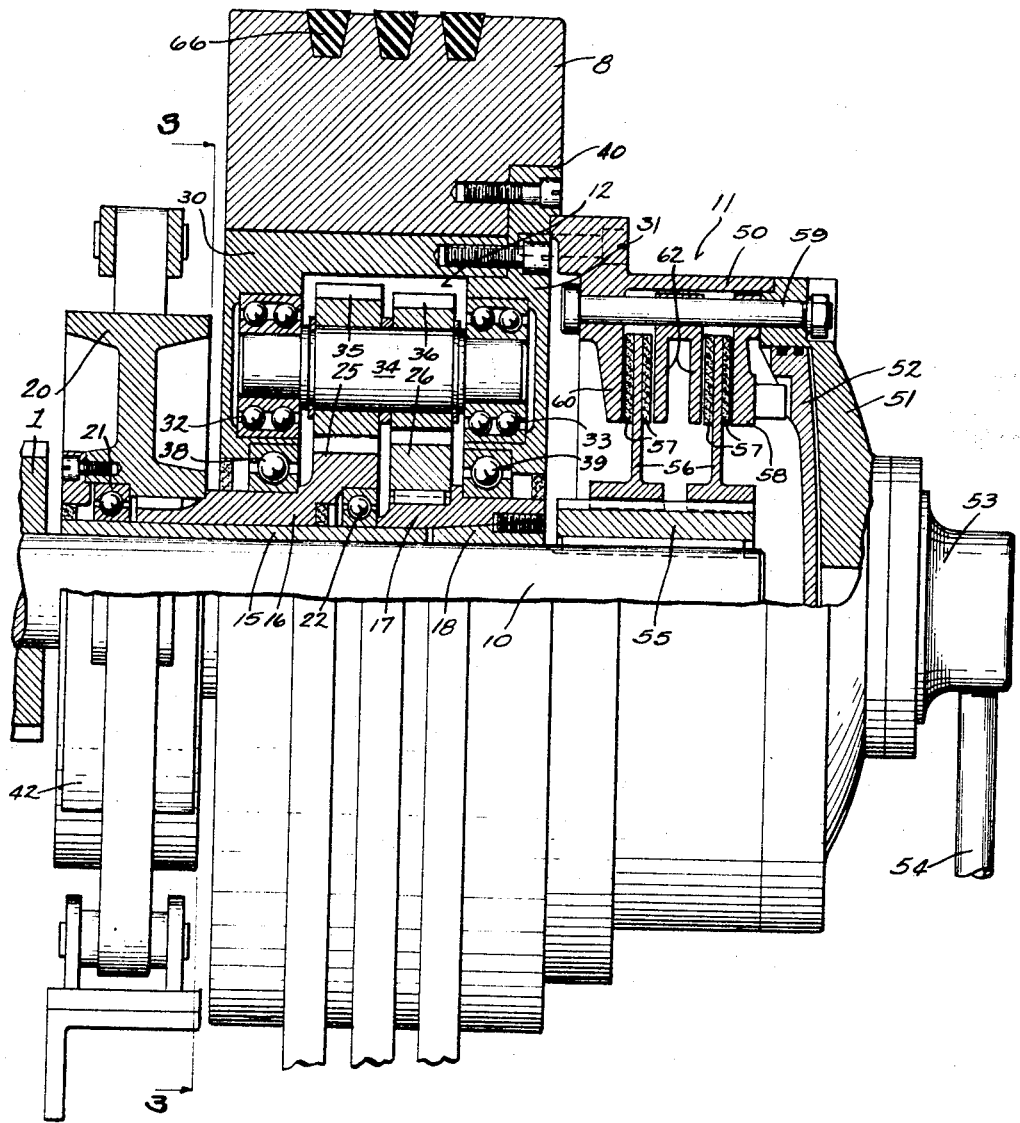
FIG. 2 is an enlarged fragmentary detail view partly in elevation and partly in axial section showing the manner in which the flywheel and planetary transmission and clutch and brake mechanism assembly is mounted on the load shaft which constitutes the drive shaft for the press brake in FIG. 1.

Pressure received through the fluid line 54 and the swivel 53 will cause piston 52 to advance to the left as viewed in FIG. 2, thereby subjecting the series of driving and driven disks to pressure to clutch the casing 50 to shaft 10. Since the casing is bolted through the flange 40 to the flywheel, the engagement of this fluid operated clutch will connect the flywheel in direct drive relation to shaft 10. Under these conditions the brake shoe 42 will be free of pressure engagement with the drum 20 and the planetary gear set will revolve as a unit.

As a convenient means of control, the slide 6 which carries tool 5 carries a cam finger 67 that engages the switch actuator 68 of double throw switch 69 just before the tool meets with high resistance. The switch contactor 70 is normally engaged with contact 71 to energize solenoid 72 which maintains valve 73 in a position to admit air from line 74 to line 54 leading to the direct drive clutch.

When the switch is actuated to engage contactor 70 with contact 75, solenoid 76 is energized to throw the valve 73 to a position in which the clutch piston 52 is relieved of pressure and pressure is applied to brake ram 44. Thus the transmission is shifted from direct drive to low speed drive. When the working stroke of the tool is completed, the cam finger releases the switch actuator and the brake ram cylinder is vented concurrently with restoration of pressure to the direct drive clutch.

If the pressure on clutch 11 is released and braking pressure is applied to drum 20, the gear 25 will stop and the planetary movement of gear 35 in mesh with gear 25 will rotate gear 36 to rotate gear 26 and thereby to rotate shaft 10 at a rate of reduced speed which may be designed to produce any selected ratio of shaft movement to flywheel movement. The instant device permits the flywheel to rotate eight times for every shaft rotation but reductions of 1500 to 1 are achieved just as easily through the use of this structure. In any case, when the flywheel is called upon to assist the load shaft during the heavily loaded interval of press operation, the flywheel continues its rotation with substantially unimpaired speed and is given great mechanical advantage over the load shaft.

It is obviously immaterial to the present invention whether the flywheel is driven from shaft 10 or constitutes a source of power for shaft 10. In either case the flywheel will be storing energy throughout much of the cycle of the machine tool operation, during direct drive connection to the shaft. In practice, in this particular machine, the driving motor pulley 65 is connected by means of belts 66 directly to flywheel 8. However, the operation of the device is essentially the same, whether the flywheel is directly or indirectly driven. In either instance, the present invention replaces gearing and controls costing many times as much and operating much less smoothly than does the continuously meshing planetary transmission as herein disclosed.

When the problem is one of reversal of motion instead of mere retarding of motion, known principles of planetary transmission design permit the instant device to be installed in essentially the same manner as herein disclosed to accommodate complete reversal of the driven shaft while still permitting the flywheel to continue in its substantially uninterrupted rotation, no serious jar or shock being involved in the change of rate or direction of motion.

I claim:

1. In a machine having a driven part subject to predetermined periodic load fluctuation between relatively heavy load and relatively light load, the combination with such a part, of means for the actuation thereof including a driving shaft, a flywheel, means for driving the flywheel at a substantially constant rate, means including a planetary transmission and a clutch for selectively coupling the flywheel with the shaft at differing ratios, said transmission including reduction gears having a ratio in substantially the proportion of the heavy load to the light load to which the driven part is subject, and means for automatically varying the ratio of drive between the flywheel and the shaft in anticipation of changes in load to which said part is subject, said means including mechanism for selectively coupling the flywheel directly with the shaft through said clutch means and for coupling the flywheel with the shaft through said reduction gears, the flywheel continuing in rotation at a substantially constant rate and the rate of rotation of the shaft varying inversely with the load to which the driven part is subject, the flywheel absorbing energy when coupled with the shaft through said clutch means and delivering energy to the shaft with increased mechanical advantage when coupled with the shaft through said reduction gears.

2. In a machine having a reciprocable driven part subject to periodic load fluctuation between relatively heavy load and relatively light load, a transmission for driving said part including rate changing mechanism having reduction and mechanical-advantage-increasing gearing, automatically operated means operated in the course of reciprocation of said part for periodically including said gearing in said transmission in anticipation of periods of heavy load to which the part is subject, and means for driving said part through said transmission and including a source of power and a flywheel and means for selectively coupling the flywheel through said transmission with said part alternately inclusive and exclusive of said gearing, said flywheel continuing in rotation at a substantially constant rate and storing energy when said part is subject to relatively light load and delivering energy through the said transmission to said part with increased mechanical advantage when said part is subject to relatively heavy load.

3. A machine according to claim 2 in which the machine includes a drive shaft having operative connection with said reciprocable driven part, the transmission reduction gearing comprising sun gears coaxial with the shaft, a planetary gear carrier having means supporting it for rotation coaxially with the drive shaft, planetary gear means on the carrier meshing with the respective sun gears, means mounting the flywheel upon the carrier, and the selective coupling means including clutch and brake means having mechanism for selectively energizing them for engaging them alternatively with the respective sun gears, the clutch means including means for drivingly connecting to said shaft the sun gear engaged by said clutch means, the automatically operated means for periodically changing the ratio of the gearing comprising a member in the path of reciprocation of said driven part and having mechanism for the selective energization of the clutch and brake means.

4. In a machine having a driven part subject to periodic load fluctuation between relatively heavy load and relatively light load, the combination with such part, of a driving shaft having operative driving connection with said part, a planetary carrier having means supporting it for rotation coaxially with the shaft, coaxial sun gears of different ratio, one of which has means connecting it to the shaft and the other of which is rotatable with respect to the shaft and provided with a brake, planetary pinion means on said carrier meshing with the sun gears, clutch means for selectively coupling the planetary carrier with the shaft, a flywheel mounted on the carrier, driving means connected with the flywheel and carrier, and means for automatically periodically energizing the clutch means and the brake in alternation to absorb energy in the flywheel and to clutch the flywheel and carrier to the shaft during periods in which the driven part is subject to light load and to deliver energy at increased mechanical advantage from the flywheel to the shaft by releasing the clutch means and applying the brake to said other sun gear for driving the flywheel and the shaft through the pinion means and gears aforesaid during periods when the driven part is subject to heavy load, the flywheel continuing in rotation at a substantially constant rate and the rate of rotation of the shaft and mechanical advantage of the flywheel over the shaft varying inversely with the load to which the driven part is subject.

(References on following page)

References Cited by the Examiner

UNITED STATES PATENTS

| | | |
|---|---|---|
| 1,813,040 | 7/1931 | Ferris. |
| 2,794,350 | 6/1957 | Hart _____ 74—781 X |
| 3,074,297 | 1/1963 | Sommer et al. _____ 74—795 |

FOREIGN PATENTS 751,384  6/1956  Great Britain.

DAVID J. WILLIAMOWSKY, *Primary Examiner.*

DON A. WAITE, *Examiner.*

M. H. FREEMAN, T. C. PERRY, *Assistant Examiners.*